(12) United States Patent
McIntire et al.

(10) Patent No.: US 11,105,634 B2
(45) Date of Patent: Aug. 31, 2021

(54) POSITIONING AND NAVIGATION SYSTEMS AND METHODS

(71) Applicant: Government of the United States, as represented by the Secretary of the Air Force, Wright-Patterson AFB, OH (US)

(72) Inventors: John P. McIntire, Dayton, OH (US); Frederick Webber, Xenia, OH (US); Duy Nguyen, Dayton, OH (US); Eric Vinande, Centerville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/712,392

(22) Filed: Dec. 12, 2019

(65) Prior Publication Data

US 2020/0158509 A1 May 21, 2020

Related U.S. Application Data

(62) Division of application No. 15/627,796, filed on Jun. 20, 2017, now abandoned.

(60) Provisional application No. 62/490,813, filed on Apr. 27, 2017.

(51) Int. Cl.
*G01C 21/20* (2006.01)
*G01C 3/06* (2006.01)

(52) U.S. Cl.
CPC .............. *G01C 21/20* (2013.01); *G01C 3/06* (2013.01)

(58) Field of Classification Search
CPC ......... G01C 21/20; G01C 3/06; G01C 21/165
See application file for complete search history.

(56) References Cited

U.S. PATENT DOCUMENTS

| 7,289,541 | B2 | 10/2007 | Elam |
| 7,420,510 | B2 | 9/2008 | Kolavennu et al. |
| 7,724,610 | B2 | 5/2010 | Supino et al. |

(Continued)

FOREIGN PATENT DOCUMENTS

WO WO2006137071 A2 12/2006

OTHER PUBLICATIONS

Guttorm Ringstad Opshaug, A Leapfrog Navigation System, PhD Dissertation, The Department of Aeronautics and Astronautics and The Committee on Graduate Studies of Stanford University, May 2003.

(Continued)

*Primary Examiner* — Brian P Sweeney
(74) *Attorney, Agent, or Firm* — AFMCLO/JAZ; Charles R. Figer, Jr.

(57) ABSTRACT

A method includes receiving relative position data from a laser range finder, where the relative position data includes a distance and a relative angle between a first node and a second node measured by the laser range finder from a first position of the first node. The method may also include computing a second position of the second node based on the relative position data, providing the second position of the second node to a computing device of one or more of the first node and the second node, and computationally reconstructing a route traversed by the first node and the second node from a number of computed positions for the first node and the second node based on data received from the laser range finder.

15 Claims, 9 Drawing Sheets

(56) References Cited

U.S. PATENT DOCUMENTS

| | | |
|---|---|---|
| 8,031,227 B2 | 10/2011 | Neal et al. |
| 8,078,401 B2 | 12/2011 | Supino et al. |
| 8,660,786 B2 | 2/2014 | Bengtson et al. |
| 8,688,375 B2 | 4/2014 | Funk et al. |
| 8,706,414 B2 | 4/2014 | Funk et al. |
| 8,965,688 B2 | 2/2015 | Bandyopadhyay et al. |
| 9,008,962 B2 | 4/2015 | Bandyopadhyay et al. |
| 9,046,373 B2 | 6/2015 | Bandyopadhyay et al. |
| 9,080,886 B1 | 7/2015 | Lacaze et al. |
| 9,091,549 B2 | 7/2015 | Taylor, Jr. et al. |
| 9,140,557 B2 | 9/2015 | Taylor, Jr. et al. |
| 9,217,643 B1 | 12/2015 | Belenkii et al. |
| 2008/0077326 A1 | 3/2008 | Funk et al. |
| 2009/0071805 A1 | 3/2009 | Horning et al. |
| 2009/0073045 A1 | 3/2009 | Supino et al. |
| 2009/0326795 A1 | 12/2009 | Supino et al. |
| 2010/0004860 A1 | 1/2010 | Chernoguz et al. |
| 2012/0059583 A1 | 3/2012 | Supino et al. |
| 2014/0203970 A1 | 7/2014 | Taylor et al. |
| 2014/0203971 A1 | 7/2014 | Taylor, Jr. et al. |
| 2014/0207374 A1 | 7/2014 | Taylor, Jr. et al. |
| 2015/0241562 A1 | 8/2015 | Goldberg et al. |
| 2016/0025502 A1 | 1/2016 | Lacaze et al. |

OTHER PUBLICATIONS

Guttorm R. Opshaug, Leapfrog Navigation System, Proceedings of the 15th International Technical Meeting of the Satellite Division of The Institute of Navigation (ION GPS 2002), Sep. 24-27, 2002.

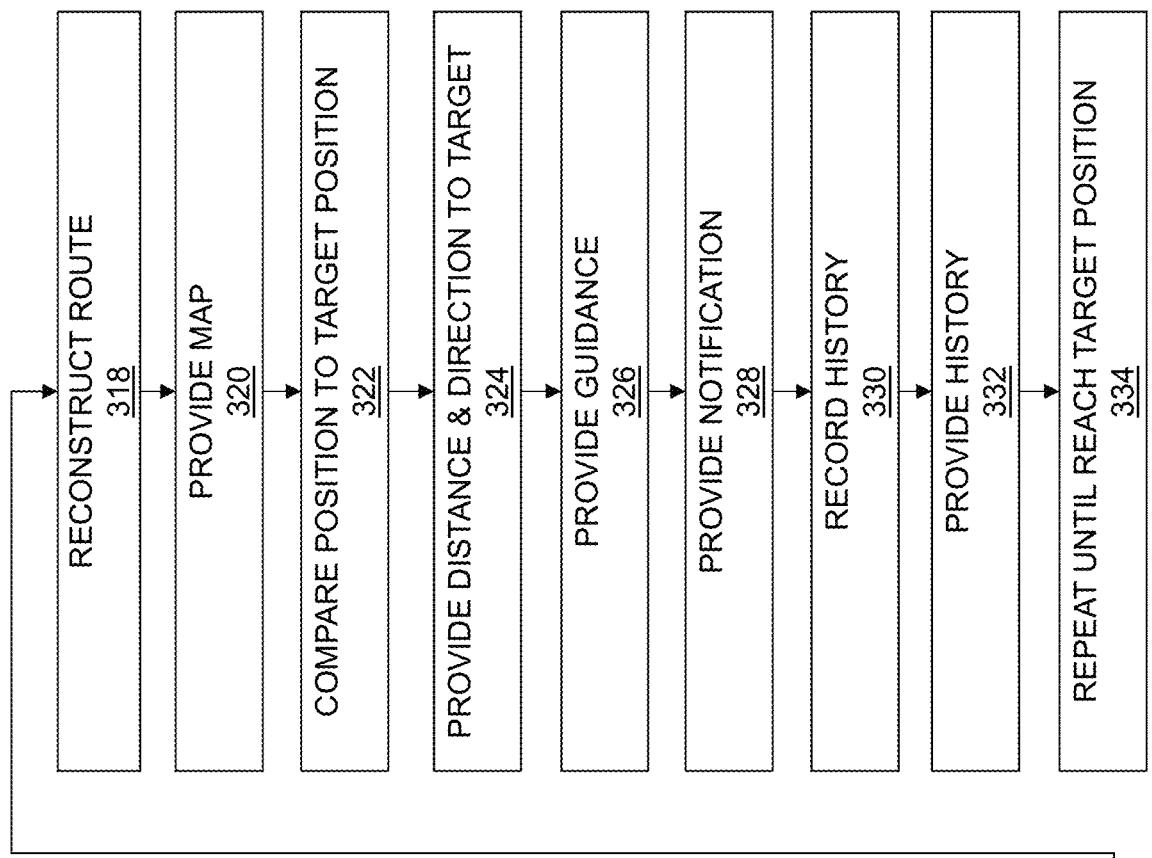
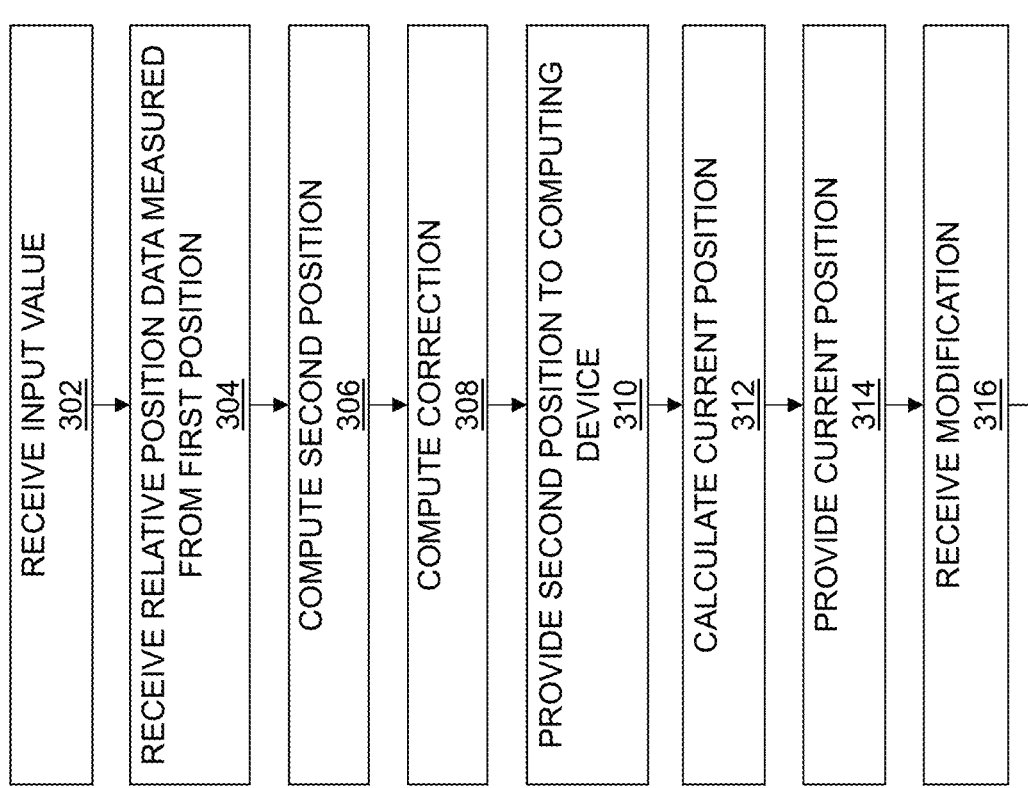
FIG. 3

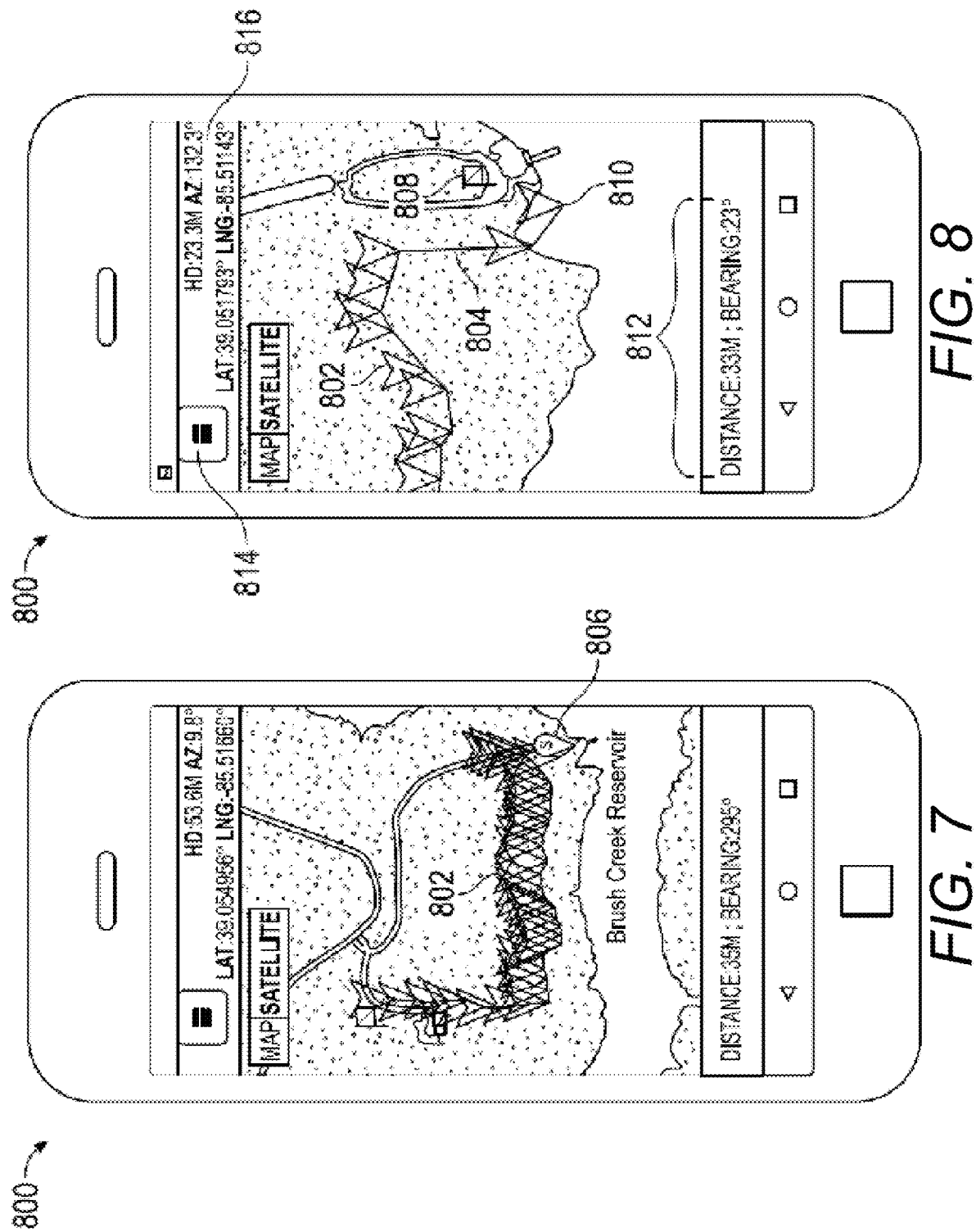

POSITIONING AND NAVIGATION SYSTEMS AND METHODS

CROSS-REFERENCE TO RELATED APPLICATIONS

This application is a divisional of U.S. application Ser. No. 15/627,796, entitles "Positioning and Navigation Systems and Methods," filed on Jun. 20, 2017, which claims the benefit of U.S. Provisional Application No. 62/490,813 filed Apr. 27, 2017, the contents of which are hereby incorporated by reference in their entireties.

STATEMENT OF GOVERNMENT INTEREST

The invention described herein may be manufactured, used, and licensed by or for the Government of the United States for all governmental purposes without the payment of any royalty.

BACKGROUND

Positioning and navigation, or other coordinated movement of nodes such as persons, can be difficult or challenging in areas with limited or no global positioning system (GPS) capability or otherwise in areas limiting the use of external navigation aids, such as in thick wilderness, rugged terrain, and the like. For example, when information from GPS or global navigation satellite systems (GNSS) is unavailable or denied, performing navigation is often a difficult, laborious, and error-prone process. Successful positioning and navigation may also be hampered by human factors, such as difficulty using a traditional map and a compass, difficulty moving or seeing over rugged or canopied terrain, and the unavailability of prominent landmarks for reference. Technical solutions often depend on specific weather conditions or the availability of detailed map data for specialized sensors. Additionally, existing dead-reckoning technical solutions (orienteering) often suffer from ever-increasing error drift, and often require foot-step counting (pedometry) or other ways to track distance traveled, as well as ways to track heading/bearing, usually with a mechanical compass. The few alternative technological navigation aids that offer high positional accuracy over lengthy periods of time and vast distances are often too cumbersome to carry and are powered inefficiently for long journeys. For example, inertial measurement units are often big and bulky, and can require boot-mounting for optimal performance. Such systems also often tend to drift rapidly over time and distances without burdensome, regular corrections. These issues are especially prominent for, e.g., search-and-rescue teams, firefighters, tunnel workers, hikers, orienteers, explorers, and the like. Defaulting to map and compass for navigation is an option but suffers from its own drawbacks as stated above. Additionally, tactical military cross-country map and compass navigation may be complicated by factors such as distance, mission time restraints, equipment to be carried, weather, terrain, and a threat of enemy engagement. Absolute positioning systems may also or instead be used, including stellar navigation and GPS systems, but the availability or efficiency of these systems can be limited in certain areas as stated above.

More recently, technological peer-to-peer ranging tools have been used to position mobile teams over long-distances in a "leapfrogging" manner, where leapfrogging includes the repeated, continuous surpassing or overtaking of another team member to move into a new position. Such tools are described, for example, in Guttorm R. Opshaug, "A Leap-Frog Navigation System," Department of Aeronautics and Astronautics, Stanford University (2003) (hereinafter "Opshaug"), which is hereby incorporated by reference in its entirety. Opshaug appears to investigate the accuracy of using either a GPS differential or an Ultra-Wide Band (UWB) radio for performing ranging, and applying these measurements and calculations to theoretical leapfrogging teams. However, the Opshaug techniques appear to be limited to peer-to-peer ranging technology requiring four team members to perform the techniques, as well as requiring UWB devices. Thus, the Opshaug techniques are likely to be hampered by team member coordination and the immaturity of peer-to-peer ranging technologies such as GPS and UWB radios.

There remains a need for improved systems and methods for positioning and navigation.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 3 is a flow chart of a method for positioning and navigation, in accordance with a representative embodiment.

FIG. 7 illustrates a map of a positioning system, in accordance with a representative embodiment.

FIG. 8 illustrates a map of a positioning system, in accordance with a representative embodiment.

DETAILED DESCRIPTION

Figure 1:
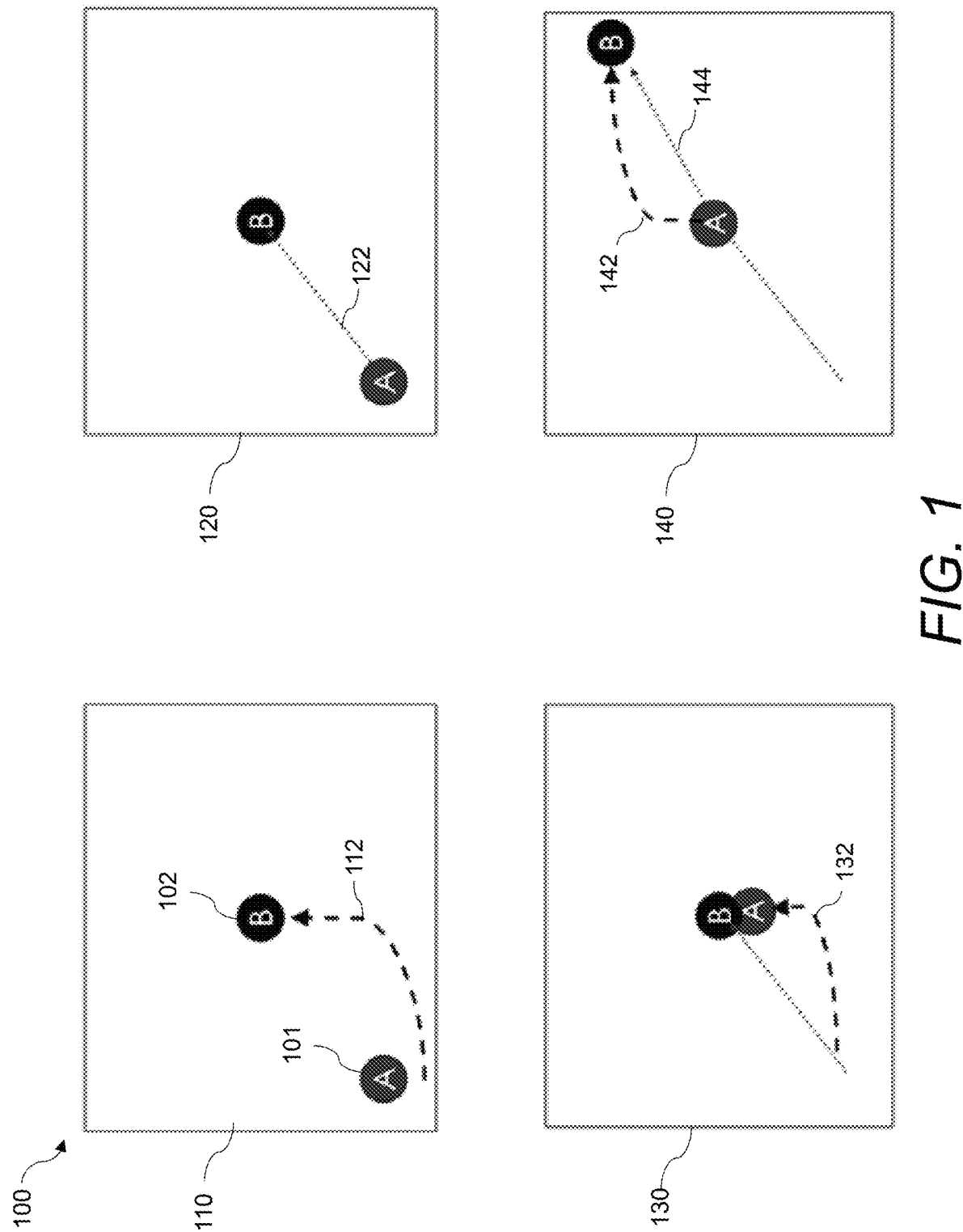
FIG. 1 illustrates a leapfrogging scheme, in accordance with a representative embodiment.

The various methods, systems, apparatuses, and devices described herein generally provide for positioning and navigation, e.g., using a leapfrogging scheme.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may be configured for, and may include, positioning and navigation techniques using a leapfrogging scheme. More specifically, the present disclosure includes a dead-reckoning navigation system and method that combines various map and compass orienteering techniques with concepts from collaborative positioning and field surveying. Using two or more nodes (where nodes may include, e.g., people, robots, vehicles, drones, or combinations thereof), and performing ranging and/or directional measurements (e.g., using a laser range finder), the nodes may take turns moving from a starting position (e.g., a known starting position). Techniques may also be used to track measurements, reconstruct an estimated route taken by the nodes, and provide current position estimates to the nodes. Using the disclosed techniques, positional errors may be on the order of about 1-3.0% positional error per distance traveled, and may reach as low as about 0.5 to 1.0% error. The disclosed techniques may be used by search-and-rescue teams, forest firefighters, other emergency personnel, orienteers, cave explorers, hikers, and other mobile groups or teams. The disclosed techniques may track positions with relatively high precision in regions where global positioning systems (GPS) may be degraded, denied, or temporarily unavailable. It will be understood that any reference to "GPS" throughout this disclosure shall include any and all Global Navigation Satellite Systems (GNSS) unless explicitly stated to the contrary or otherwise clear from the context. Thus, techniques may utilize, supplement, or replace any satellite navigation systems that provide autonomous geo-spatial positioning with global coverage such as GPS, GLONASS, Galileo, Beidou, and other such systems.

Thus, systems and methods disclosed herein may include coordinated movements of team members (or other nodes), utilizing tools for ranging and bearing estimation, which can permit long distance relative spatial positioning (e.g., akin to dead-reckoning) into areas of GPS degradation or denial. It will be understood that the coordinated movements of team members (or other nodes) may include ground or land movements, overwater or underwater movements, air movements, underground movements, and so on. The systems and methods disclosed herein may be relatively low-cost, easy-to-use, and may require very little in the way of sophisticated tools or computational resources, e.g., including only that movements be coordinated among nodes during a journey along a route. Systems and methods may be well-suited for rugged terrain and for relatively long distances (e.g., several miles or more).

Implementations may include a method for team navigation that allows for long-distance movements with the potential for high positional tracking accuracy, and may be relatively simple and straightforward for users. The disclosed implementations may include a dead-reckoning technique that utilizes a hybrid navigation method combining various features of orienteering, field surveying, and collaborative positioning. In its simplest scheme, techniques may be used by at least two nodes having a device to measure distances and directions—e.g., a laser range finder.

Although leapfrogging techniques are generally known in the art, leapfrogging systems and methods of the prior art generally do not propagate positional information forward with high accuracy; instead, prior art techniques mostly require the use of compass bearings during treks for accuracy.

FIG. 1 illustrates a leapfrogging scheme, in accordance with a representative embodiment. By way of introduction, FIG. 1 shows a multi-node (two-node) leapfrogging scheme 100 that is broken into four parts for clarity—a first part 110, a second part 120, a third part 130, and a fourth part 140. As shown in the scheme 100, each measurement pair creates a vector that allows a node to reconstruct a path taken and estimate a current position. The leapfrogging scheme 100 may include at least two nodes—a first node 101 (shown as Node 'A' in the figure) and a second node 102 (shown as Node 'B' in the figure).

The first part 110 of the leapfrogging scheme 100 may include the second node 102 traveling to a second position and stopping while the first node 101 remains stationary, where the first dashed arrow 112 represents the path of travel of the second node 102.

The second part 120 of the leapfrogging scheme 100 may include the first node 101 measuring (e.g., using a laser range finder or the like) the distance and direction to the second node 102, which allows the estimation of a new position—the second position of the second node 102. The first vector 122 in the figure represents the distance and direction to the second position of the second node 102.

The third part 130 of the leapfrogging scheme 100 may include the first node 101 traveling toward the second position, and overtaking and replacing the second position of the second node 102, where the second dashed arrow 132 represents the path of travel of the first node 101. As explained below, the first node 101 may instead travel to another position different from the second position of the second node 102.

The fourth part 140 of the leapfrogging scheme 100 may include the second node 102 traveling to a new position and stopping while the first node 101 remains stationary, where the third dashed arrow 142 represents the path of travel of the second node 102. The measurement process may then be repeated, where the first node 101 measures the distance and direction to the new position of the second node 102, which allows for an estimation of the new position. The second vector 144 represents the distance and direction to the new position.

Thus, in certain implementations, from a starting position, a first node 101 remains stationary while the second node 102 travels some distance (e.g., about 25 to 75 meters) into the region of interest, before stopping to serve as a temporary target or waypoint. From the starting position, the second node's distance and bearing may be measured. These measurements may provide a vector relative to the starting position, thus giving a high-precision estimate of the new position. Once relative position data is recorded, the first node 101 may be released to move forward to a new position, e.g., the same position as the second node 102, where the second node 102 remains immobile until overtaken by the first node 101. The first node 101 can leap farther ahead, or trade places, and this measurement process may be repeatedly indefinitely for each segment of a journey. Thus, in certain implementations, at all times, one node is immobile during any movement of the other node thereby serving as a temporary anchor, which preserves and then propagates the positional estimate for each measured segment of a journey. In other implementations, each node may be moving. For example, this may be accomplished by marking (visually or otherwise) positions by one or more of the nodes—e.g., marking the ground by drawing an 'X' in dirt/gravel so that both the first node 101 and the second node 102 move at the same time, and where the second node 102 may have about the same level of assurance of duplicating positions as with the second node 102 remaining stationary.

In this manner, techniques disclosed herein may provide a way to propagate a known position far forward into GPS-denied territory. It will be understood that, in addition to, or instead of a laser range finder, bearings or directions could be measured using a mechanical sighting compass, a digital compass, or using a theodolite or total-station type of portable protractor device. Similarly, distances can be measured using step-counting technology, laser ranging, acoustics, Ultra-Wide Band (UWB) radios, or other suitable ranging methods.

Figure 2:
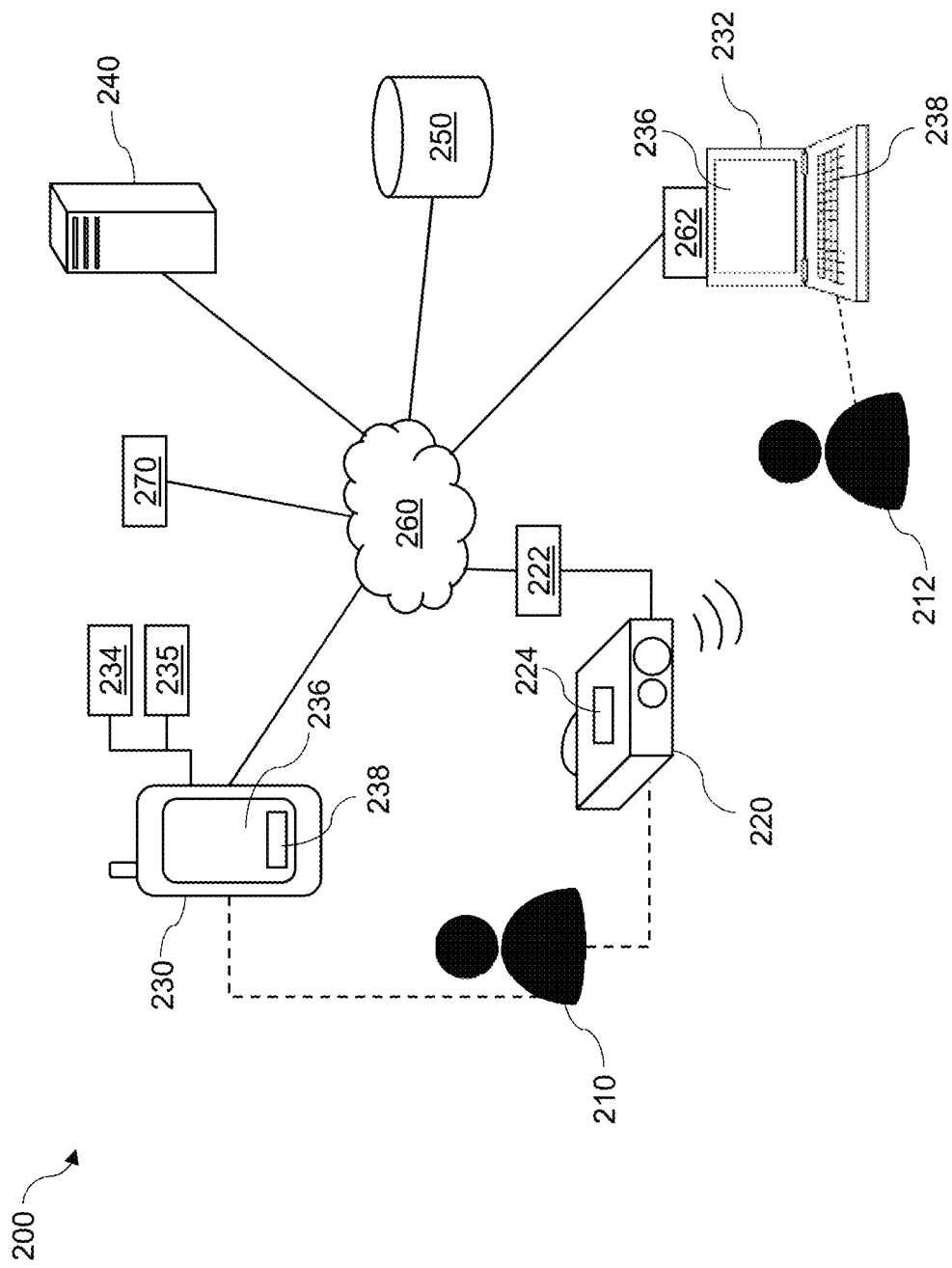
FIG. 2 illustrates a positioning system, in accordance with a representative embodiment.

FIG. 2 illustrates a positioning system, in accordance with a representative embodiment. The system 200 may include a plurality of nodes (e.g., a first node 210 and a second node 212 as shown in the figure), a laser range finder 220, a plurality of computing devices (e.g., a first computing device 230 and a second computing device 232 as shown in the figure), a server 240, and a database 250. One or more of the foregoing components of the system 200 may be interconnected in a communicating relationship via a data network 260 using communications interfaces 262.

The plurality of nodes may include at least two nodes as shown in the figure. The nodes may include one or more of a person, a robot, a drone, a vehicle, and the like. For example, each of the first node 210 and the second node 212 may include a person as shown in the figure, or one or more of the first node 210 and the second node 212 may also or instead include a robot or some other apparatus exhibiting one or more degrees of autonomy. Thus, it will be understood that, as used herein, the term "robot" shall include an apparatus exhibiting one or more degrees of autonomy, such as an unmanned aerial vehicle, an unmanned ground vehicle, a droid, a naval vessel, an anthropomorphic type apparatus or system, and so forth. In certain implementations, at least one of the plurality of nodes includes a steering mark or the like. For example, the first node 210 may include one or more of a person and a robot, and the second node 212 may include a steering mark. It will be understood that a "steering mark" as used in this disclosure may include a temporary or permanent environment feature or positioning marker used by one or more of the nodes. For example, the steering mark may include a large, distinct, or otherwise recognizable object, e.g., distinct enough to merit its own representation on a map or in providing someone directions for navigation. Thus, the steering mark may exist both in the real-world and on a map. Also, or instead, the steering mark may include a temporary, "on-the-fly" type of steering mark such as a rock visible in the distance (i.e., if a node can tell it apart from other rocks), a tree among other trees (again, as long as it is relatively distinct), a building or other man-made structure, and so on. Thus, the steering mark may not be located on a traditional map. The steering mark may also or instead include marks created by one or more of the nodes.

As discussed herein, a device used by one or more of the nodes to take measurements may include a laser range finder 220. The device used by nodes to take measurements may also or instead include an acoustical device, a UWB device, an optical device, a radio device, or the like. In general, the device used by nodes to take measurements may include a tool that estimates or measures distance between nodes at any given time, such as the preferred laser-range finder 220, ranging radios, optical-acoustic beacons (ultrasound crickets), inertial measurement units (IMUs), pedometers, and mental/manual footstep counting. The device used by nodes to take measurements may also include a tool that measures relative angles or azimuths, such as an analog or digital compass, or a portable theodolite, transit, or optical protractor, where any of which may be included in a laser range finder 220. The device used by one or more of the nodes may also or instead include a plurality of devices. For example, one device may take measurements, while another device sends a signal, calculates positions, or otherwise performs one or more functions such as any of those described herein.

The laser range finder 220 may be structurally configured to measure relative position data 222 between nodes. To this end, the laser range finder 220 may include one or more tools 224 for measuring the relative position data 222. For example, the tools 224 of the laser range finder 220 may include a compass, e.g., a digital compass. The tools 224 of the laser range finder 220 may also or instead include one or more of a theodolite, a transit, a level, a tilt sensor (or one or more other sensors), and an optical protractor.

By way of example and not of limitation, the laser range finder 220 may include an integrated digital compass, where the laser range finder 220 is similar to those sold by the trade name TRUPULSE 360R from LASER TECHNOLOGY, INC. Thus, the laser range finder 220 may include a ruggedized, handheld device with an integrated digital compass to measure azimuth, a tilt sensor, and Bluetooth connectivity. In use, the laser range finder 220 may automatically provide a horizontal distance measurement that takes into account a vertical tilt of an integrated sensor. The laser range finder 220 may be connected to one or more of the computing devices via a Bluetooth connection or another short-range communications protocol, or a wired connection (or otherwise).

The relative position data 222 may include at least a distance and a relative angle between the first node 210 and the second node 212 measured by the laser range finder 220, e.g., from a first position of the first node 210, which may represent a starting position along a route. The relative angle between the first node 210 and the second node 212 may include a relative azimuth. The relative position data 222 may also or instead include one or more of a direction and a timestamp. The relative position data 222 may be transmitted over the data network 260 to one or more computing devices, servers 240, databases 250, or otherwise. In some instances, the relative position data 222 may lack azimuth and elevation data, and may thus include position offset data only. The relative position data 222 may be transformed into actual position data using techniques as described herein.

As discussed herein, the relative position data 222 may be used by one or more of the first node 210 and the second node 212. Also, or instead, the relative position data 222 may be used by a BLUFOR (i.e., Blue Force—friendly unit) tracking application or the like, e.g., where a node cannot use the relative position data 222 or other information (for whatever reason) and so it is used remotely for BLUFOR tracking or the like.

The plurality of computing devices may include at least one of a first computing device 230 and a second computing device 232 as shown in the figure. The first computing device 230 may include, or may otherwise be in communication with, a processor 234 and a memory 235. The processor 234 may be configured by computer executable code stored in the memory 235 to receive the relative position data 222 from the laser range finder 220. The processor 234 may further be configured by computer executable code stored in the memory 235 to compute a second position of the second node 212 based on the relative position data 222, provide the second position of the second node 212 to one or more of the first node 210 and the second node 212 (e.g., for use in traversing to a target position from the starting position), and to computationally reconstruct a route traversed by the first node 210 and the second node 212 from a number of computed positions for the first node 210 and the second node 212 based on data received from the laser range finder 220.

Thus, in general, the system 200 may include computational components with software to reconstruct a traversed route, provide a history of paths or positions, provide an up-to-date estimate of a current position, and facilitate an associated graphical and alphanumerical display of pertinent information.

At least one of the plurality of computing devices may include one or more of a display 236 and a user interface 238. In certain implementations, the position of one or more of the plurality of nodes is provided on the display 236. For example, the second position of the second node 212 may be provided on a display 236 of the computing device of the first node 210.

Although shown as separate devices in the figure, it will be understood that the first computing device 230 and the second computing device 232 may be the same device, or otherwise their functionality may be provided for in a single device, e.g., a smart phone. For example, the computing device that receives relative position data 222 from the laser range finder 220, computes positions of the nodes, computationally reconstructs a route traversed by the nodes, and provides positions of the nodes may be the same computing device that displays the positions of the nodes and a route of the nodes on a display 236 thereof. Thus, providing positions of the nodes may include displaying the positions on a display 236 of a computing device of one or more of the nodes. In other implementations, the first computing device 230 and the second computing device 232 are separate devices as shown in the figure.

The plurality of computing devices may include any devices within the system 200 operated by nodes (or other operators) to manage, monitor, communicate with, or otherwise interact with other participants in the system 200. In addition to, or instead of smart phones, this may include desktop computers, laptop computers, network computers, tablets, smart watches or other wearable devices, PDAs, or any other device that can participate in the system 200 as contemplated herein. In an implementation, a computing device (and a display 236 and a user interface 238 thereof) is integral with another participant in the system 200, such as the laser range finder 220 or a node itself.

In general, a computing device may be electrically coupled in a communicating relationship, e.g., an electronic communication, with any of the components of the system 200. In general, a computing device may be operable to control the components of the system 200, such as the laser range finder 220. To this end, the computing device may include any combination of software and/or processing circuitry suitable for controlling the various components of the system 200 described herein including without limitation processors 234, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, a computing device may include the processor 234 or other processing circuitry with sufficient computational power to provide related functions such as executing an operating system, providing a graphical user interface 238 (e.g., to a display 236 coupled to a computing device or another component of the system 200), set and provide rules and instructions for operation of a component of the system 200, and operate a web server 240 or otherwise host remote operators and/or activity through a communications interface 262 described below.

A computing device may generally provide a user interface 238, which may include a graphical user interface (e.g., on the display 236), a text or command line interface, a voice-controlled interface, and/or a gesture-based interface. The user interface 238 itself may create a suitable display 236 on the computing device for operator interaction. In implementations, the user interface 238 may control operation of one or more of the components of the system 200, as well as provide access to and communication with one or more of the laser range finder 220, the server 240, the database 250, other computing devices, and other resources 270.

The user interface 238 may be maintained by a locally executing application on a computing device that receives data from one or more of the components of the system 200 or other resources. In other embodiments, the user interface 238 may be remotely served (e.g., by the server 240) and presented on a computing device, such as where the server 240 includes a web server that provides information through one or more web pages or the like that can be displayed within a web browser or similar client executing on the computing device. In implementations, the user interface 238 may also or instead be provided by and/or disposed on another participant in the system 200, e.g., the laser range finder 220.

The processor 234 may include an onboard processor for a computing device. The processor 234 may also or instead be disposed on another component of the system 200 or be disposed separately, e.g., connected to one or more participants of the system 200 through the data network 260, e.g., using a communications interface 262. The processor 234 may be any as described herein or otherwise known in the art. In an implementation, the processor 234 is included on, or in communication with, a server 240 that hosts an application for operating and controlling components in the system 200.

The memory 235 may include any as described herein or otherwise known in the art. The memory 235 may contain computer code and may store data such as relative position data 222, positions or routes of the nodes, and so on. The memory 235 may contain computer executable code stored thereon that provides instructions for the processor 234 for implementation of its functionality as described herein. The memory 235 may include a non-transitory computer readable medium. The memory 235 may be included on a removable memory device such as a USB drive, memory stick, or the like, which may be used for example to transfer data between components of the system 200.

The memory 235 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 235 may store program instructions, program data, executables, and other software and data useful for controlling operation of the components of the system 200 and configuring the components of the system 200 to perform functions for a user.

The memory 235 may, in general, include a non-volatile computer readable medium containing computer code that, when executed by components of the system 200 creates an execution environment for a computer program in question, e.g., code that constitutes processor firmware, a protocol stack, a database management system, an operating system, or a combination of the foregoing, and/or code that performs some or all of the operations set forth in the various flow charts and other algorithmic descriptions set forth herein. While a single memory 235 is depicted, it will be understood that any number of memories may be usefully incorporated into components of the system 200. The processor 234 and the memory 235 can be supplemented by, or incorporated in, logic circuitry.

The server 240 may include may include data storage, a network interface, and a processor 234 and/or other processing circuitry. The server 240 may also include a web server that provides web-based access by one or more components of the system 200 to the capabilities of the server 240, e.g., including any of the processing capabilities or algorithms described herein. The server 240 may include a blade server, a server computer, an application server, a database server, a cloud computing resource, and the like. When the system 200 is implemented as a client server architecture, the server 240 may manage the connections and interactions with each component of the system 200, generate HTML code to send to each component of the system 200, receive data from each component of the system 200, and the like. The server 240 may be implemented in hardware or software. Non-limiting examples of code include HTML, JavaScript, Python, Java, C++, and the like.

The database 250 may store historic information and data for the system 200. The historic information and data for the system 200 may include a history of a plurality of positions of nodes along a route, relative position data 222 for each of the plurality of positions of nodes along a route, a history of routes taken by the nodes, and the like.

The data network 260 may include any network(s) or internetwork(s) suitable for communicating data and control information among participants in the system 200. For example, the data network 260 may include a short-range data communications network, or a near-field communications network, such as Bluetooth or an infrared communications system.

The data network 260 may also or instead include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 200. The data network 260 may include wired or wireless networks, or any combination thereof. One skilled in the art will also recognize that the participants shown the system 200 need not be connected by a data network 260, and thus can be configured to work in conjunction with other participants independent of the data network 260.

Communication over the data network 260, or other communication between components of the systems 200 described herein, may be provided via one or more communications interfaces 262. The communications interface 262 may be suited such that any of the components of the system 200 can communicate with one another. Thus, the communications interface 262 may be present on one or more of the components of the system 200, e.g., on the laser range finder 220 and the plurality of computing devices. In general, a communications interface 262 of one or more of the laser range finder 220 and a computing device may include one or more short-range communications protocols.

The communications interface 262 may include, or be connected in a communicating relationship with, a network interface or the like. The communications interface 262 may include any combination of hardware and software suitable for coupling the components of the system 200 to a remote device (e.g., a computing device such as a remote computer or the like) in a communicating relationship through a data network 260. By way of example and not limitation, this may include electronics for a wired or wireless Ethernet connection operating according to the IEEE 802.11 standard (or any variation thereof), or any other short or long-range wireless networking components or the like. This may include hardware for short range data communications such as Bluetooth or an infrared transceiver, which may be used to couple into a local area network or the like that is in turn coupled to a data network such as the interne. This may also or instead include hardware/software for a WiMAX connection or a cellular network connection (using, e.g., CDMA, GSM, LTE, or any other suitable protocol or combination of protocols).

The system 200 may include other resources 270 such as other hardware or other software in addition to, or instead of, components described above. In certain implementations, the other resources 270 may include a camera, or one or more sensors. The other resources 270 may also or instead include a power source such as solar power, battery power, wind power, fossil fuel sourced power, and so on.

The other resources 270 may also or instead include input devices such as a keyboard, a touchpad, a computer mouse, a switch, a dial, a button, and the like, as well as output devices such as a display 236, a speaker or other audio transducer, light emitting diodes or other lighting or display components, and the like. The other resources 270 may also or instead include a variety of cable connections and/or hardware adapters for connecting to, e.g., external computers, external hardware, external instrumentation or data acquisition systems, and the like.

FIG. 3 is a flow chart of a method 300 for positioning and navigation, in accordance with a representative embodiment. The method 300 may be performed using any of the systems described herein, e.g., such as the system 200 shown in FIG. 2 above.

As shown in box 302, the method 300 may include receiving one or more input values from a user. The input values may include one or more of a starting position, a local magnetic declination, and a target position.

The user that inputs one or more of the input values may include one of the nodes that is being navigated and positioned using the method 300. The node may submit an input value while in the field, e.g., on the route between a starting position and a target position. The user that inputs one or more of the input values may also or instead include a remote user or operator. An input value may also or instead be inputted automatically, and as such, the user may include a computing device having a processor such as any as described herein.

The input value may be entered using, e.g., a computing device having a user interface such as any of those described herein. There may be a variety of ways for the method 300 to receive an input value. By way of example, when the input value is a starting position, there may be at least three ways for a system to receive this information, i.e., there may be a variety of ways a user can initialize their known starting position at the beginning of their trek. For example, a near-field communication (NFC) wireless tag with pre-specified coordinates can be held up to the computing device, which automatically transfers starting GPS coordinates into the system. Coordinates or other position data may instead be manually input into a computing device, e.g., known GPS (latitude/longitude) position coordinates are manually typed into the appropriate format to set a starting position. By way of other example, a user may use functionality of a graphical display such as a pin drop on a map displayed on a computing device. Thus, if current coordinates are unknown, but an absolute position can be specified in relation to a map (e.g., via a visible landmark or other steering mark, temporary or otherwise), a user may manually drop a graphical marker ('pin') onto the map.

As shown in box 304, the method 300 may include receiving relative position data from a laser range finder. As described herein, the relative position data may include a distance and a relative angle between a first node and a second node as measured by the laser range finder from a first position of the first node (or from the position of the second node). The first position of the first node may be the starting position of the nodes along the route—e.g., a known starting position. The relative position data may be received by one or more computing devices, e.g., a computing device of the first node, a computing device of the second node, a remote computing device, and so on.

As shown in box 306, the method 300 may include computing a second position of the second node based on the relative position data. The second position may be computed using one or more computing devices as described herein. Thus, the second position may include position data that is computed from the relative position data provided by the laser range finder or the like.

Computation of a new position may thus be based on a previous position (calculation or input) and the latest laser range finder measurements. For example, using logged laser range finder measurements, and a known starting position, a new position estimate can be inferred by the appropriate geometry, and this data may be logged on a computing device.

As shown in box 308, the method 300 may include computing a correction for one or more of the relative position data and the second position of the second node. The correction may be based, at least in part, on one or more of the input values such as a local magnetic declination value inputted by the user as described above. The correction may be computed using one or more computing devices as described herein. The correction may be based on a known or estimated error, and thus may include an error correction.

Thus, in certain implementations, automatic compass measurement corrections are provided, e.g., based on local magnetic declination values. This value may be modifiable by a user (e.g., one or more nodes), and may be set appropriately at the start of data collection, with values specific to each region of the globe. This value may be accessed online or via an appropriate look-up table.

As shown in box 310, the method 300 may include providing the second position of the second node to a computing device, e.g., a computing device of the first node, a computing device of the second node, a remote computing device, and so on. For example, the second position of the second node may be provided on a display of the computing device of the first node. The second position of the second node, or any of the positions of nodes, may include one or more of a distance between nodes (e.g., a distance from the first node to the second node), a direction between nodes (e.g., a direction from the first node to the second node), and a timestamp of measurement of the relative position data. The second position of the second node, or any of the positions of nodes, may be provided to the first node in an alphanumeric format. Other formats are also or instead possible, including without limitation one or more of binary, Cyrillic, or other symbols or signals that a computer or an end-user can interpret. For example, for a human user, icons such as arrows or target symbols may be used.

By providing (e.g., displaying on a display) position data or other data to a user (e.g., a node), such as a laser range finder readings, the method 300 allows a user to perform on-the-fly error checking, e.g., to confirm that a laser range finder reading matches on-screen values from the computing device, and to confirm/disconfirm a suspected bad reading (such as an inadvertent button press on the laser range finder).

In certain implementations, the second position is provided to the first node (e.g., a computing device of the first node), for example, for use by the nodes in traversing from a starting position to a target position. After receiving the second position, the first node may traverse to a third position. The third position may be a new position for the first node, i.e., different from the first position discussed above. In certain implementations, the third position is substantially the same as the second position of the second node. In this manner, the first node may travel to the position of the second node after receiving information pertaining to the second position. In other implementations, the third position is different from the second position of the second node. In this manner, the first node may travel to another position, different from the position of the second node, e.g., where the second node takes a new measurement with the laser range finder relative to the third position.

As shown in box 312, the method 300 may include calculating a current position of one or more of the nodes, e.g., calculating a current position of the first node. For example, the current position of the first node may be calculated based at least in part on the relative position data from the laser range finder and a known starting position of the first node. The current position may be calculated using one or more computing devices as described herein. The current position may be updated with each new relative position data measurement by the laser range finder.

As shown in box 314, the method 300 may include providing the current position of the first node to a computing device as described herein, e.g., one or more of the computing device of the first node and a second computing device of the second node. The current position of a node may be provided in an alphanumeric format (e.g., GPS latitude and longitude), or any other format described herein or otherwise known in the art. It will be understood that the current position of one or more of the nodes may include a relative position or an absolute position, where the absolute position includes an absolute start and magnetic declination.

As shown in box 316, the method 300 may include receiving a modification by one or more of the first node and the second node, or another user. The modification may be related to one or more of a position of the first node, a position of the second node, the relative position data, and the route. The modification may also or instead include a change to a current position of one or more of the first node and the second node. This change may be based on a steering mark or landmark observable by one or more of the first node and the second node. A correction may be computed (as described herein) based on an estimated error, which may be based on this change. Thus, the change may not include an error estimate but rather a position estimate. An error correction may instead be provided by a Kalman filter, an absolute update, or similar. The modification may be entered using, e.g., a computing device having a user interface such as any of those described herein.

In certain implementations, the modification includes a deletion by a user, e.g., one of the nodes. This may include the deletion of a last position, which gives a user the ability to manually erase the last point to account for a suspected erroneous laser range finder measurement, an inadvertent double button-press, or the like.

The modification may also or instead include an update to a current position, which may provide a user with the ability to modify the current position estimate, e.g., in the case that a visible landmark or steering mark can be matched to a corresponding landmark or steering mark on a map. This may allow for knowledge of absolute position to be incorporated seamlessly into the systems and methods described herein, if and when it becomes available during a trek.

As shown in box 318, the method 300 may include computationally reconstructing a route traversed by the first node and the second node from a number of computed positions for the first node and the second node based on data received from the laser range finder. One or more computing devices as described herein may be used for the computational reconstruction of the route. For example, providing positions and computationally reconstructing the route may be performed by the computing device of the first node. Providing positions and computationally reconstructing the route may also or instead be performed by a remote computing device.

As shown in box 320, the method 300 may include providing a map on the display of a computing device, e.g., the computing device of the first node. The map may include the route traversed by the first node and the second node from the number of computed positions. In this manner, the route or positions may be overlaid on the map.

The map may include one or more of: a current position of one or more of the first node and the second node (e.g., a graphical indicator of the nodes' current position), a history of computed positions for the first node and the second node (e.g., graphical indicators of the nodes' past positions), a target position, a starting position, a measurement from the laser range finder, a current heading, a remaining distance to a target position, a remaining distance to a waypoint, a direction to a target position, a direction to a waypoint, and a waypoint indicator icon along the route. Thus, the map may include target positions or waypoints, e.g., if any are selected or otherwise provided by a user (such as one or more nodes). In certain implementations, target positions and waypoints may be selected by a user via a graphical user interface such as a map pin drop technique, or by manually inputting coordinates (e.g., GPS coordinates). The map may also or instead include an on-screen compass that displays a current heading. The current heading may include a real-time measurement of the compass on a computing device (e.g., a smart phone) showing which direction the device is pointing. The map may also or instead include a visual indicator to notify the first node of compliance with following a desired path or direction. Certain implementations may include simultaneous localization and mapping (SLAM) techniques, e.g., where the map includes the reconstructed route.

As discussed herein, the computing device may include a user interface, e.g., on the display of the computing device. In this manner, the map may be interactive on the computing device. For example, the map may include functionality to zoom and pan the map image with a finger touch user input or the like. The map may also or instead include the ability for a user to drop a pin on the map, e.g., for position identification, adjustment, or confirmation, or for waypoint or target position marking. The map is discussed in more detail below in this disclosure with reference to FIGS. 7 and 8.

As shown in box 322, the method 300 may include comparing a current position of one or more of the first node and the second node to a target position. The comparison may be calculated using one or more computing devices as described herein.

As shown in box 324, the method 300 may include providing a distance and a direction to the target position based on the comparison in box 322. The distance and direction to the target position may be provided on one or more computing devices as described herein, e.g., a display thereof.

As shown in box 326, the method 300 may include providing guidance to one or more of a target position and a waypoint, e.g., if a target position or waypoint has been entered into the system. The guidance may be provided on one or more computing devices as described herein, e.g., a display thereof. Guidance to a target or waypoint may provide a user with an estimated distance and direction of travel from their current position to the target position or waypoint. Additionally, an on-screen compass indicator may show a current heading (e.g., utilizing a smart phone's onboard integrated digital compass), where the on-screen compass indicator may change color to indicate when a user is heading in a correct direction or an incorrect direction using predetermined or user-specified tolerances (e.g., within about 15 degrees). The map may also or instead include an on-screen compass that displays a current heading. Thus, the current heading may include a real-time measurement of the compass on a smart phone showing which direction the phone is pointing. By way of example, the display may light up green when the phone is facing in the general direction (e.g., within a certain tolerance such as plus or minus 15 degrees) to the target position. In this manner, the current heading may orient a node in a desired general direction as the node is moving.

As shown in box 328, the method 300 may include providing a notification to a computing device, e.g., a first computing device of the first node, a second computing device of the second node, and so on. The notification may include an alert such as audio (e.g., a beep), visual (e.g., text, light), tactile (e.g., a click), haptic (e.g., a vibration), or otherwise. The notification may indicate that a node is on a correct or incorrect route of travel. The notification may also or instead inform a user that a laser range finder measurement was detected and recorded by the computing device.

The notification may include connectivity information. For example, a user may receive a warning of a loss of connectivity, and an indication related to a reconnect ability that allows a user to know if a connection has been dropped, and allows an automatic reconnect without disrupting any data logging. This may be useful if a wireless connection inadvertently drops (e.g., due to low batteries, or if the laser range finder is out of range of the computing device).

As shown in box 330, the method 300 may include recording a history of a plurality of positions of nodes along the route. The history, or other data, may be recorded or saved in a memory such as any of those as described herein, e.g., a memory on a computing device of one or more of the nodes. The history may include relative position data for each of the plurality of positions of nodes along the route.

The method 300 may also or instead include logging measurements from the laser range finder, logging entered data (such as input values), and so forth. For example, each measurement of the laser range finder may be logged on the computing device, which can provide the distance (e.g., in meters), the direction (e.g., in compass degrees), and timestamps for each measurement.

As shown in box 332, the method 300 may include providing the history of the plurality of positions of nodes along the route to one or more of the nodes, e.g., one or more of the first node and the second node. The history of the plurality of positions of nodes along the route may be shown on a map, e.g., a map disposed on a display of a computing device.

As shown in box 334, the method 300 may include repeating one or more of the boxes described in the method 300 above until a target position is reached by one or more of the nodes (e.g., within a certain tolerance). For example, the method 300 may include repeating, for a number of different positions along the route, receiving of relative position data from the laser range finder, computing of positions of nodes, and providing positions of nodes to computing devices of one or more of the nodes.

Therefore, the method 300 may start from a known position, where a first node remains stationary while a second node moves forward in the direction of travel. After some time, the second node stops and remains stationary while one or more of the nodes measures the distance and azimuth (e.g., compass bearing) between nodes using a laser range finder. Once the measurement is taken, the distance and direction data may be automatically, in near real-time, and wirelessly transmitted to a computing device for logging on a memory. An estimate of the second node's current position can now be computed. Once computed, the first node may be released, and may travel forward to overtake the second node's position, who remains stationary during first node's travel. The nodes may swap positions, and second node may become free to move forward again, while the first node again remains stationary. Again, after some travel, the second node stops and another measurement is taken.

The method 300 may be repeated in this manner, with one node always remaining stationary while another is in transit. This may allow the entire route of two or more nodes to be computationally-reconstructed based on recorded sequential vectors (though errors in the measurement process may slowly accumulate into position estimate errors, as discussed in more detail below). Using this method 300, it may even be possible for a single node to utilize the leapfrogging scheme, e.g., if distinct, large, or otherwise obvious targets in an environment can be utilized as stationary "attack points" as opposed to performing ranging and bearing exclusively to another person. In this manner, steering marks may be nodes in the method 300.

Thus, while one node moves, another node remains stationary in a method 300 as described herein. Using this technique, a plurality of combined vector (i.e., segment) measurements may allow the entire traversed route to be reconstructed. A position estimate may then be propagated forward. In this manner, the historical path and current position may be reconstructed based on a known starting point for the nodes.

In certain implementations, a computer may implement one or more functions or actions of the method 300 above. For example, an application running on a computing device (e.g., a smart phone) may implement one or more functions or actions of the method 300. Thus, in an implementation, a computer program product comprising computer executable code embodied in a non-transitory computer readable medium that, when executing on one or more computing devices, may perform the following: receiving relative position data from a laser range finder, the relative position data comprising a distance and a relative angle between a first node and a second node measured by the laser range finder from a first position of the first node; computing a second position of the second node based on the relative position data; providing the second position of the second node to a computing device of one or more of the first node and the second node; and computationally reconstructing a route traversed by the first node and the second node from a number of computed positions for the first node and the second node based on data received from the laser range finder.

Figure 4:
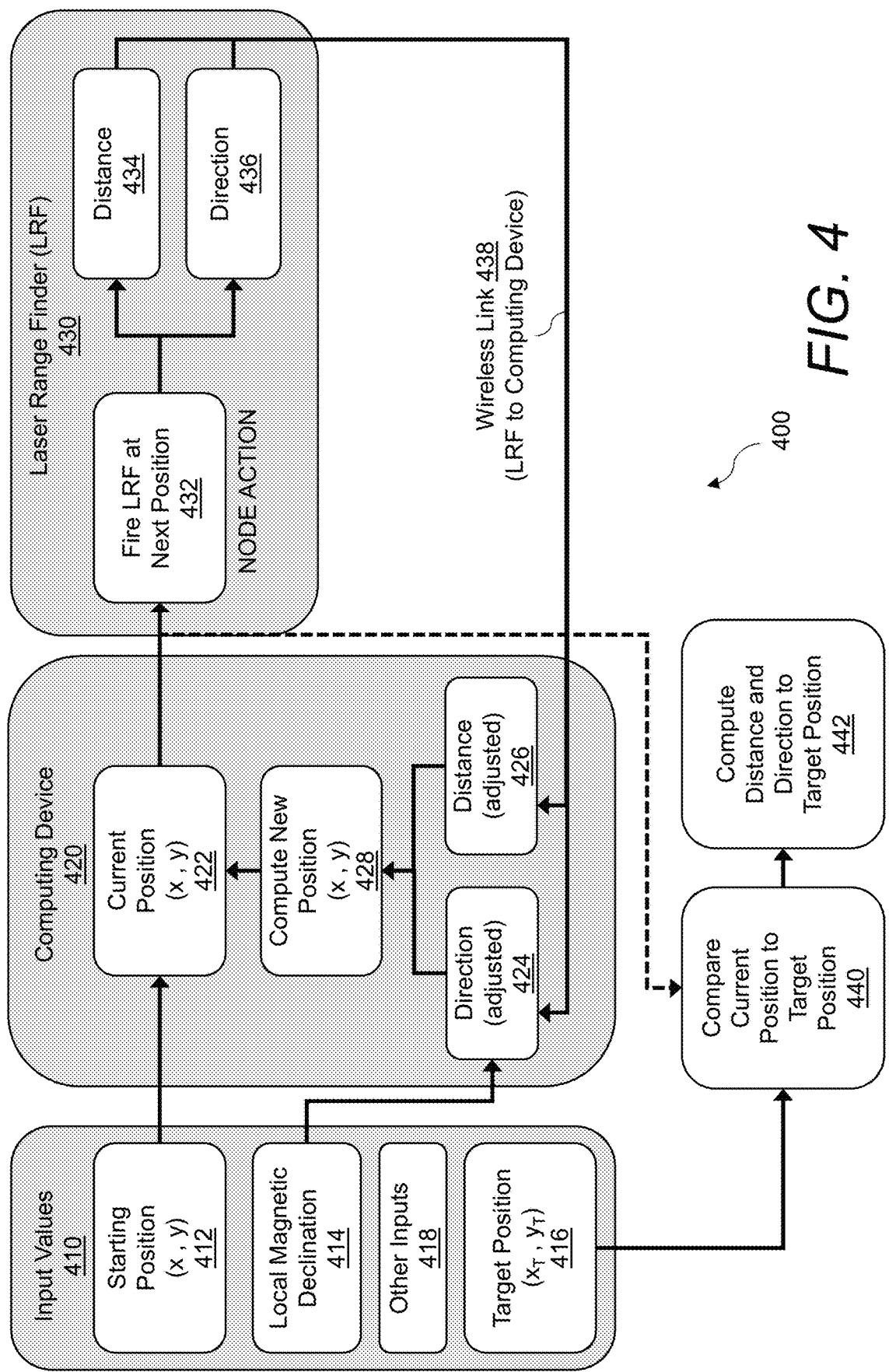
FIG. 4 is an information flow chart for positioning and navigation, in accordance with a representative embodiment.

FIG. 4 is an information flow chart for positioning and navigation, in accordance with a representative embodiment. This figure may represent the flow 400 of data/information according to one or more of the techniques described herein, e.g., the method 300 with reference to FIG. 3 above.

The flow 400 of information may begin with the receipt of one or more input values 410 provided by a user such as one or more of the nodes being navigated. As discussed herein, the input values 410 may include one or more of a starting position 412 for the nodes (which may be provided in coordinates), a local magnetic declination 414, a target position 416 (which may be provided in coordinates), as well as other inputs 418. The input values 410 may be entered into a computing device 420.

The computing device 420 may include any as described herein, e.g., a smart phone of a node being navigated. The computing device 420 may provide a current position 422 (which may be provided in coordinates) to a user such as one or more of the nodes being navigated. The current position 422 may also or instead be provided by a user such as one or more of the nodes being navigated. In certain implementations, a calculated current position is compared to an entered current position for error correction or calibration.

As discussed herein, a laser range finder 430 may be used by one or more of the nodes to determine a position of another node, as demonstrated by box 432 (labeled "Fire LRF at Next Position"). The laser range finder 430 may provide a measured distance 434 and direction 436 between nodes. There may be a wireless link 438 between the laser range finder 430 and the computing device 420 for conveying this measured information (i.e., conveying relative position data as described herein).

Using the relative position data from the laser range finder 430, the computing device 420 may calculate an adjusted direction 424 and an adjusted distance 426, e.g., taking into account one or more of the current position 422 and input values 410. The computing device 420 may then compute a new position 428 (which may be provided in coordinates) for providing to a user such as a node being navigated.

As also shown in the figure, the flow 400 of information may use the target position 416 for comparison to the current position 422 (or another position such as the computed new position 428) as shown by box 440. The distance and direction to the target position 416 may also be computed as shown by box 442. This information may be provided to a user such as one or more of the nodes being navigated, e.g., using a display of the computing device 420. In certain implementations, inclination may be used to adjust lateral distance. For example, some devices may only measure lateral distances, where the terrain may be assumed to be generally flat. It is also or instead possible that arc length and height (e.g., height above geoid or above sea level) could be propagated, such as in a highly-mountainous region or places with other relatively large changes in altitude, e.g., in caves or undersea environments.

Various schemes and variants of the systems and methods discussed herein will now be described. Specifically, systems and methods using different numbers of nodes and movement methods will now be described. It will be understood that, in general, the systems and methods discussed herein may be implemented using one or more nodes.

Figure 5:
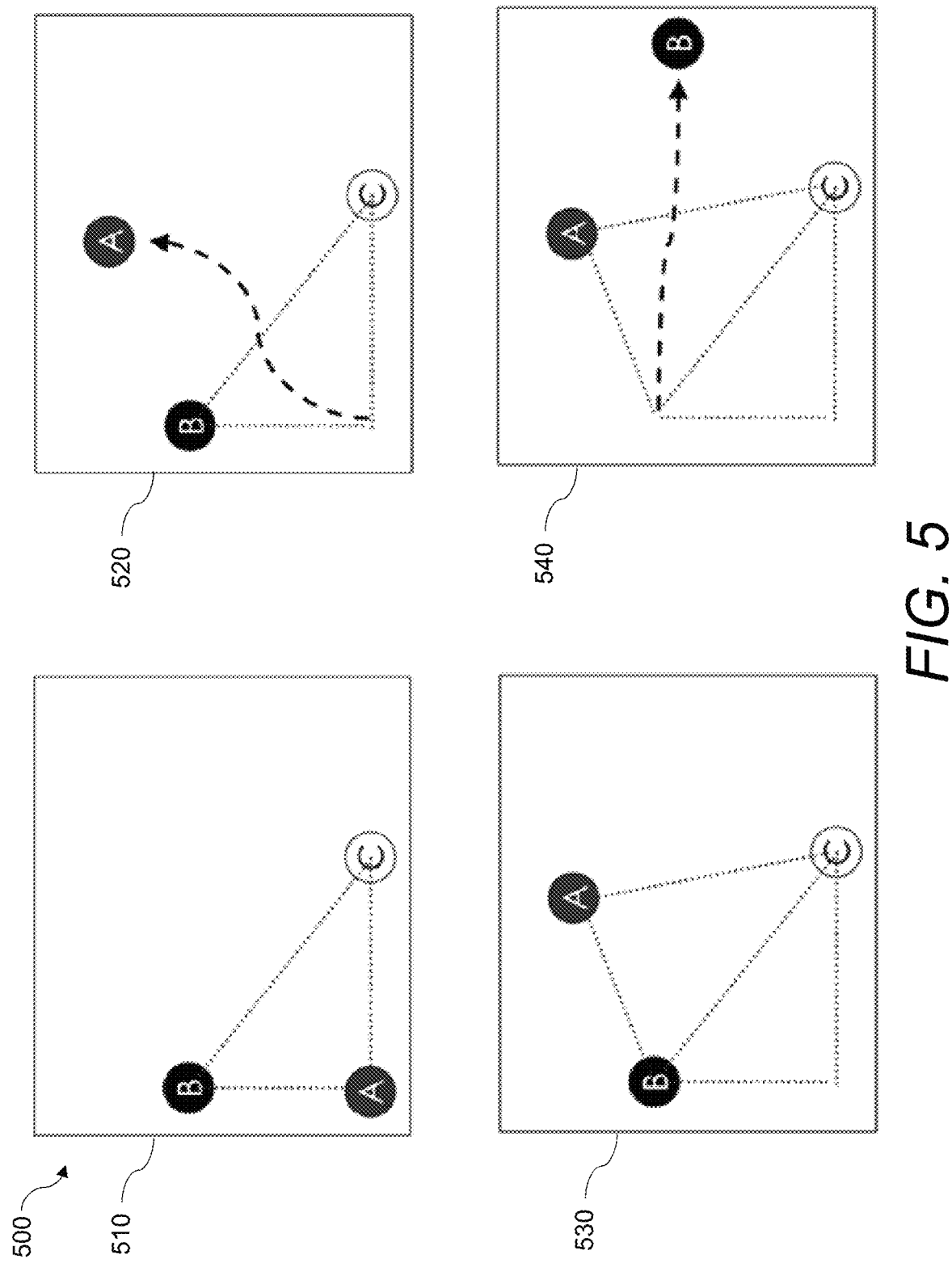
FIG. 5 illustrates a three-node leapfrogging scheme, in accordance with a representative embodiment.

By way of example, FIG. 5 illustrates a three-node leapfrogging scheme, in accordance with a representative embodiment.

As shown in the first part 510 of the leapfrogging scheme 500, from two known starting positions, Nodes A, B, and C may be disposed cross-range from one another while stationary.

As shown in the second part 520 of the leapfrogging scheme 500, two nodes (Node B and Node C) may act as anchors while another node (Node A) moves into a region of interest.

As shown in the third part 530 of the leapfrogging scheme 500, upon reaching a desired distance, Node A may stop and remain stationary, which allows another node (Node B) to move to a new position as shown in the fourth part 540 of the leapfrogging scheme 500.

Thus, in a three-node leapfrogging scheme 500, each measurement set may create a triangle that allows reconstruction of the route taken, and thus allows for an estimate of the new position after moving. However, this may be omitted—given specific assumptions, angle and azimuth may not be needed for three or more nodes.

The three-node leapfrogging scheme 500 may be easily extended to a four-node scheme, which may allow pairs of nodes to move together. For example, in a four-node scheme, two nodes may remain stationary to act as anchors while two other nodes are released to move into a region of interest. In a four-node scheme, each measurement set may create a quadrilateral that allows reconstruction of the path taken, and thus allows for an estimate of each new position after moving. In a six-node leap-frogging scheme, three nodes may act as anchors in order to determine the position of the other three nodes based on only the positions of the anchors.

Systems and methods described herein may thus include active techniques where an explicit action and intent of a node or human operator is included. However, passive techniques may also or instead be used. For example, appropriate sensors and transceivers may take advantage of natural pauses in movement (e.g., a person walking). For example, whenever a person pauses to examine a map or take in their surroundings, this pause can be detected via inertial sensors. During this time of approximately zero movement, the stationary individual becomes a temporary anchor, and his or her transceiver may begin broadcasting information such that other nodes would be able to detect their range and/or bearing to the broadcaster. However, a downside of this could include that if there is ever a point in time where all individuals on the team are inadvertently moving, the position information may rapidly accumulate an error drift. An alternative may include putting the transceivers on a boot, since each foot is briefly stationary even while walking.

Beyond leapfrogging schemes with two or more nodes, it is possible to do a one-node variant, and it is also possible to exchange humans for machines for one or more nodes in any of the multiple-node schemes. In the one-node variant, the navigator may range and find a bearing to a steering mark, e.g., one that is readily recognizable or otherwise distinct. This may eliminate the need for a node to be stationary out in front, though it includes landmarks or steering marks at all points along the route. This could even be accomplished, though perhaps with lower accuracy, using a single person and a single cell phone by utilizing the cell phone compass (for direction) and a cell phone's pedometer (for estimating distance traveled). Ranging with non-human nodes provides an opportunity to remove a human from the process, without requiring regular naturally-occurring steering marks.

With ranging technology, three stationary nodes may be used to compute the position of a fourth node relative to the three stationary nodes. And, in order to free up team members to perform their own tasks, human nodes can be replaced with machines, as discussed herein. For example, with four or more UAVs, these UAVs can perform the leapfrogging schemes described herein to maintain the positional propagation. In this manner, human members of a team may be free to perform other actions and move in any direction. The machines or UAVs may continue to follow a group of humans and allow them to retrieve their estimated position at any time.

Leapfrogging schemes may also be applied to teams larger than two to four nodes. Only a few team members need to perform the scheme, while the rest of the group can move at their own pace and perform other tasks. This may allow team members trained in performing the schemes to embed into larger teams while providing positional information to the team as desired. For example, if a member of a team desired its own position update, the member could 'grab' the most recent estimate based on static nodes in the team via a simple wireless communication exchange.

Mathematics and modeling for systems and methods discussed herein will now be described.

Figure 6:
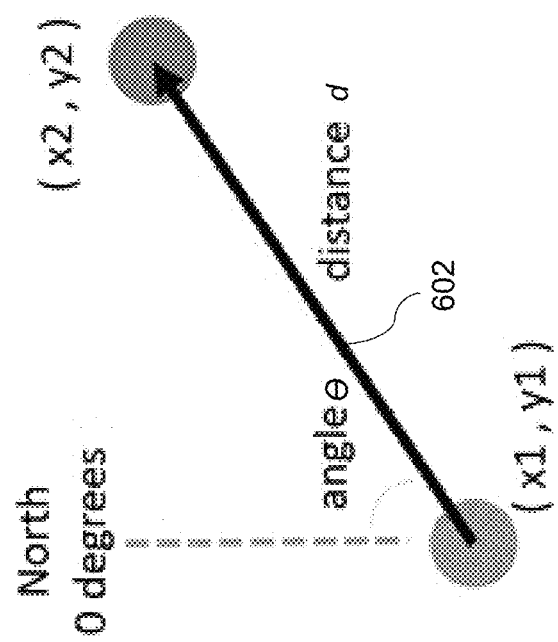
FIG. 6 illustrates movement between nodes, in accordance with a representative embodiment.

FIG. 6 illustrates movement between nodes, in accordance with a representative embodiment, and for use in the discussion of mathematics and modeling below. An algorithm for a two-node leapfrogging scheme will now be described. Given a starting coordinate $(x_1, y_1)$ in the Cartesian plane, a distance, d, and a compass direction (e.g., representing an angle relative to north), θ, provided by the measurement system (e.g., a laser range finder), a vector 602 may be created from $(x_1, y_1)$ providing a new position estimate at the tip of the vector $(x_2, y_2)$. As discussed above, this process may be repeated indefinitely. The basic formulas for this scheme, accounting for local magnetic declination, may rely on elementary trigonometry:

$$x_2 = x_1 + d^* \sin\theta \quad \text{Eq. 1}$$

$$y_2 = y_1 + d^* \cos\theta \quad \text{Eq. 2}$$

An algorithm for a three-node and four-node leapfrogging scheme will now be described. Given two ranges, $R_1$ and $R_2$, from each stationary anchor to a moving node, one can formulate this problem as the solution to the intersection between two circles, with each circle having radius $R_1$ and $R_2$ respectively, and centered on the position of each anchor.

$$(x-x_1)^2+(y-y_1)^2=r_1^2 \quad \text{Eq. 3}$$

$$(x-x_2)^2+(y-y_2)^2=r_2^2 \quad \text{Eq. 4}$$

Where x, y are the coordinates of the moving node, then $x_1, y_1$ are the coordinates of the first anchor and $x_2, y_2$ are the coordinates of the second anchor. Then this set of simultaneous equations may be solved:

$$y = -\frac{x_1 - x_2}{y_1 - y_2}x - \frac{1}{2(y_1 - y_2)}((r_1^2 - r_2^2) - (x_1^2 - x_2^2) - (y_1^2 - y_2^2)) \quad \text{Eq. 5}$$

$$x = -\frac{y_1 - y_2}{x_1 - x_2}y - \frac{1}{2(x_1 - x_2)}((r_1^2 - r_2^2) - (x_1^2 - x_2^2) - (y_1^2 - y_2^2)) \quad \text{Eq. 6}$$

An algorithm for six-node leapfrogging scheme will now be described. Given a minimum of three ranges to the stationary anchors, a Non-Linear Least Square (NLSQ) or a Newton-Raphson solution may minimize the sum of squares errors on the measured distance. It could also be solved with a genetic algorithm, or another iterative or optimization technique. The cost function is:

$$F(\theta)=F(x,y)=\sum_{i=1}^{n} f_i(x,y)^2 \quad \text{Eq. 7}$$

where:

$$f_i(x,y)=\sqrt{(x-x_i)^2+(y-y_i)^2}-r_i \quad \text{Eq. 8}$$

and where $r_i$ is the measured distance between the anchor $(x_i, y_i)$ and the mobile node position (x, y). Using the Newton-Raphson method to iteratively optimize the above cost function, where:

$$\begin{bmatrix} x_{k+1} \\ y_{k+1} \end{bmatrix} = \begin{bmatrix} x_k \\ y_k \end{bmatrix} - [J(x_k, y_k)^T J(x_k, y_k)]^{-1} J(x_k, y_k)^T f(x_k, y_k) \quad \text{Eq. 9}$$

and $$J(x_k, y_k)^T f(x_k, y_k) = \begin{bmatrix} \sum_{i=1}^{n} \frac{(x-x_i)f(x_i,y_i)}{r_i} \\ \sum_{i=1}^{n} \frac{(y-y_i)f(x_i,y_i)}{r_i} \end{bmatrix}, \quad \text{Eq. 10}$$

$$J(x_k, y_k)^T J(x_k, y_k) = \begin{bmatrix} \sum_{i=1}^{n} \frac{(x-x_i)^2}{r_i^2} & \sum_{i=1}^{n} \frac{(x-x_i)(y-y_i)}{r_i^2} \\ \sum_{i=1}^{n} \frac{(x-x_i)(y-y_i)}{r_i^2} & \sum_{i=1}^{n} \frac{(y-y_i)^2}{r_i^2} \end{bmatrix}. \quad \text{Eq. 11}$$

This procedure may be repeated until the values for x and y converge. It is worth noting that for schemes using three or more nodes, the range measurements may be a magnitude of a three-dimensional vector, while the mathematics presented above assume two-dimensional ranges. However, it is possible to utilize height (elevation) changes via a digital barometer or other tool to account for changes in terrain elevation, or via digital elevation maps. The two-node system may utilize a laser range finder with an internal inclinometer (tilt sensor), for example, to automatically account for elevation changes during the ranging process, so that the assumption of the two-dimensional mathematics is roughly valid.

Sources of error will now be discussed.

For some positioning and navigation systems, overall position error may stem from accumulated errors in the measurement of azimuth, distance, and vertical tilt. For example, a primary component of error may be the measurement of azimuth (e.g., due to digital compass error). An off-the-shelf laser range finder may have a distance measurement accuracy of ±0.3 to ±1.0 m (depending on the reflective quality of targets), inclination or tilt accuracy of ±0.25 degrees, and a compass azimuth accuracy of ±1 degrees. Other accuracies may also or instead be possible, dependent upon the equipment. Each measured 'hop' or vector segment obtained during a leapfrogging scheme may introduce these apparently random errors, but using these measures it is possible to predict positional accuracy per distance traveled for each source of error, as shown by the field examples provided in Table 1 below. In one field example, segment distances of 25 to 50 meters were common and easy to lase with confidence, while longer shots of 50 to 100 meters were only possible in more open areas. In these field examples, even longer distances were occasionally possible to lase, but difficult to do so, due to small visual angle of the target as seen through the optics, and manual instability.

TABLE 1

Estimated Accuracy (Errors) for Leapfrogging Segments

| Error Source | Error Direction | Assumed Error Magnitude | Predicted Positional Error, as % of Lased Distance | | |
|---|---|---|---|---|---|
| | | | 25 m | 50 m | 75 m |
| Distance | forward | ±0.5 m | ±2.0% | ±1.0% | ±0.5% |
| Tilt | forward | ±0.25 deg | <0.01% | <0.01% | <0.01% |
| Azimuth | lateral | ±1.0 deg | ±1.7% | ±1.7% | ±1.7% |

The error analysis in these examples suggests that the azimuth error component is fixed and steady at about 1.7% per distance lased, regardless of segment length, while the measured distance error component is dependent on segment length. This suggests that longer lasing distances of each segment may improve the overall accuracy of the positional estimate. It also suggests that system accuracy may be strengthened by improvements to both distance and azimuth measurement.

By way of example, a leapfrogging scheme as discussed herein was conducted for a total distance traveled of 3.1 km (almost 2 miles), with 115 measured segments or 'hops,' where the average hop distance was 26.7 m. In this example, the accumulated error per distance traveled at the end of each segment started off relatively high for the first ten to twelve segments (~10% error), likely due to the meter-level errors in the 'ground-truth' comparator of GPS. However, with the accumulation of more segments and farther distances traveled, this ground-truth error component became relatively smaller, and so the system's estimates became relatively more accurate before leveling off (hovering between 0 to 3% error for most of the journey). The final ending position error of this particular data collection was about 20.5 meters off (0.67%) relative to the final GPS coordinate, after traveling 3.1 km. Again, these fluctuations in accumulated error may predominantly represent error fluctuations in the ground-truth comparator (e.g., the cell phone's GPS used in this data collection). For this data set, if the accumulated error is averaged for the last eight recorded segments, in order to control for some of this GPS error, then the system's error per distance is better than the single final data point suggests, at 0.49% of distance traveled.

The map or route display will now be discussed. FIGS. 7 and 8 illustrate maps of a positioning system, in accordance with representative embodiments. Specifically, the figures show screen captures from a display of computing device (e.g., a smart phone) of examples of maps 800. The maps 800 may be included on a display that also includes a user interface as discussed herein, e.g., that allows a user to input a known starting position or other positions, or to otherwise interact with the maps 800.

In the maps 800, each segment of the journey is shown as an arrow 802, with the arrows 802 connected by a line 804 indicating an estimated path taken by the nodes along the route. The figures also show the starting position 806, the target position 808, and the actual final position 810. As shown in the map 800 of FIG. 8, in this example, the actual final position 810 produced a final ending error position of 33 meters (from the target position 808). Thus, the maps 800 may include relative information 812 with respect to a node's current position or relative position to the target position 808.

The maps 800 may also or instead include a menu 814 providing further functionality. This functionality may include, e.g., one or more of initializing a starting point or position, connecting to a laser range finder or other device, deleting a last point or position, or other functionality described herein or otherwise known in the art of maps on graphical user interfaces.

The maps 800 may also or instead include position data 816, such as the last measurements/readings from a laser range finder. This may include, e.g., a horizontal distance (HD), an azimuth (AZ), a latitude (LAT), a longitude (LNG), and so on.

In certain implementations, the user interface may include a 'guiding' feature, where a user can input a desired target position at the start of (or anytime during) the route. When this feature is activated, a 'distance-to-final destination' and 'direction-to-final destination' indicator may be provided, e.g., to help ensure a node that they are indeed traveling in an intended direction, as well as providing an indication as to how far away the node is from the target position. This information may be updated after every segment of the route. Absolute position updates, if they are available (e.g., a steering mark is identified), may also or instead be manually entered to override and update the current estimate of position, e.g., to occasionally correct for any accumulated error. The user interface may also or instead include error checking and information pertaining to the last segment measured (e.g., time elapsed, distance, and direction), which can be helpful to control sources of potential errors.

Certain implementations may use a bi-directional range or heading. For example, when a traveling node stops, leaving at least two stationary nodes, bi-directional range and heading computations can provide a second opinion as well as redundancy, in case a node misses a range record. Implementations may also or instead include an absolute update, even if only intermittently, as this may help constrain a drift to acceptable levels and provide a way to 'reset' to true position when steering marks or alternative methods or systems become available. Thus, implementations may include the ability to easily perform a manual absolute position update, e.g., via the user interface.

Figure 9:
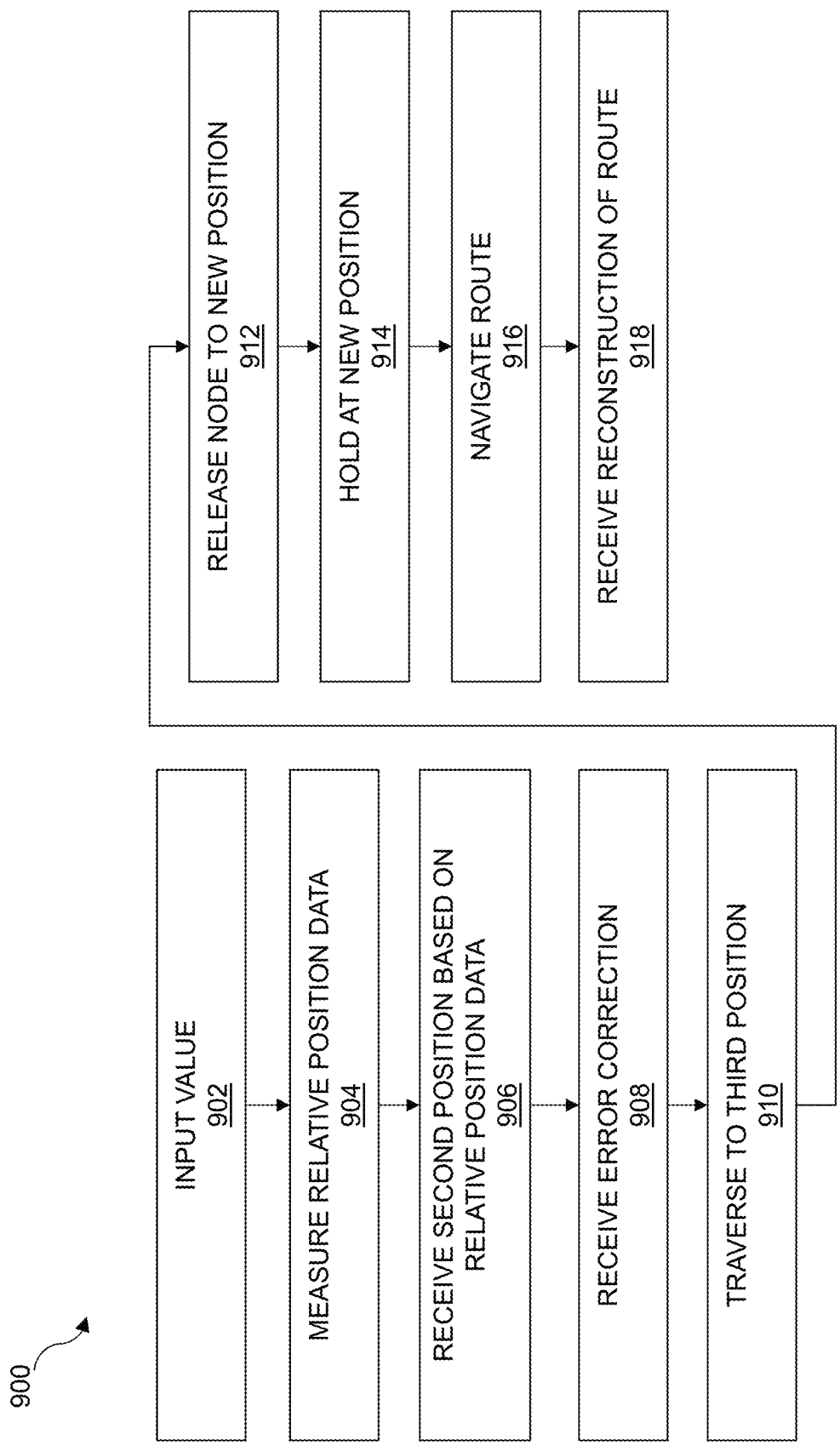
FIG. 9 is a flow chart of a method of navigating a route between a starting position and a target position, in accordance with a representative embodiment.

FIG. 9 is a flow chart of a method of navigating a route between a starting position and a target position, in accordance with a representative embodiment. While the method 300 shown in FIG. 3 may include actions taken by a computing device (or otherwise from a data processing perspective), the method 900 shown in FIG. 9 may be directed to actions taken by one or more nodes in positioning and navigation techniques described herein.

As shown in box 902, the method 900 may include inputting a value, e.g., one or more of the input values as described herein. For example, the value may include one or more of a starting position, a local magnetic declination, a known position, and a target position.

As shown in box 904, the method 900 may include measuring relative position data using a laser range finder. As described herein, the relative position data may include a distance and a relative angle between a first node located at a starting position and a second node, where the relative position data is transmitted to a computing device. The method 900 may also include receiving a confirmation of the relative position data measured by the laser range finder. The confirmation may be provided automatically, e.g., by a computing device, or manually by a node.

As shown in box 906, the method 900 may include receiving a second position of the second node based on the relative position data, e.g., on a computing device. For example, positions of nodes may be shown on a display of the computing device, and more specifically, on a map on the display.

As shown in box 908, the method 900 may include receiving a correction (e.g., an error correction) for one or more positions of one or more nodes, e.g., based at least in part on the inputted value as per box 902. For example, a portable electronic device (PED) may be sufficient; cellular capability of a smart phone or the like may not be necessary (unless used in networking); and a tablet or computer could be a sufficient replacement.

As shown in box 910, the method 900 may include traversing to a third position by the first node based on the received second position, where the third position may be a new position for the first node.

As shown in box 912, the method 900 may include releasing at least one of the first node and the second node to move to a new position.

As shown in box 914, the method 900 may include holding at the new position so that relative position data can be measured regarding the new position.

As shown in box 916, the method 900 may include navigating a route between the starting position and the target position by repeating, for a number of different positions, measuring of relative position data between nodes using the laser range finder, receiving of positions of nodes, and traversing to a new position for one node based on a received position for another node. The route may be a predetermined path between the starting position and the target position, where a node is guided along this path using the method 900.

As shown in box 918, the method 900 may include receiving a computational reconstruction of the route traversed by the first node and the second node on a display of the computing device.

Figure 10:
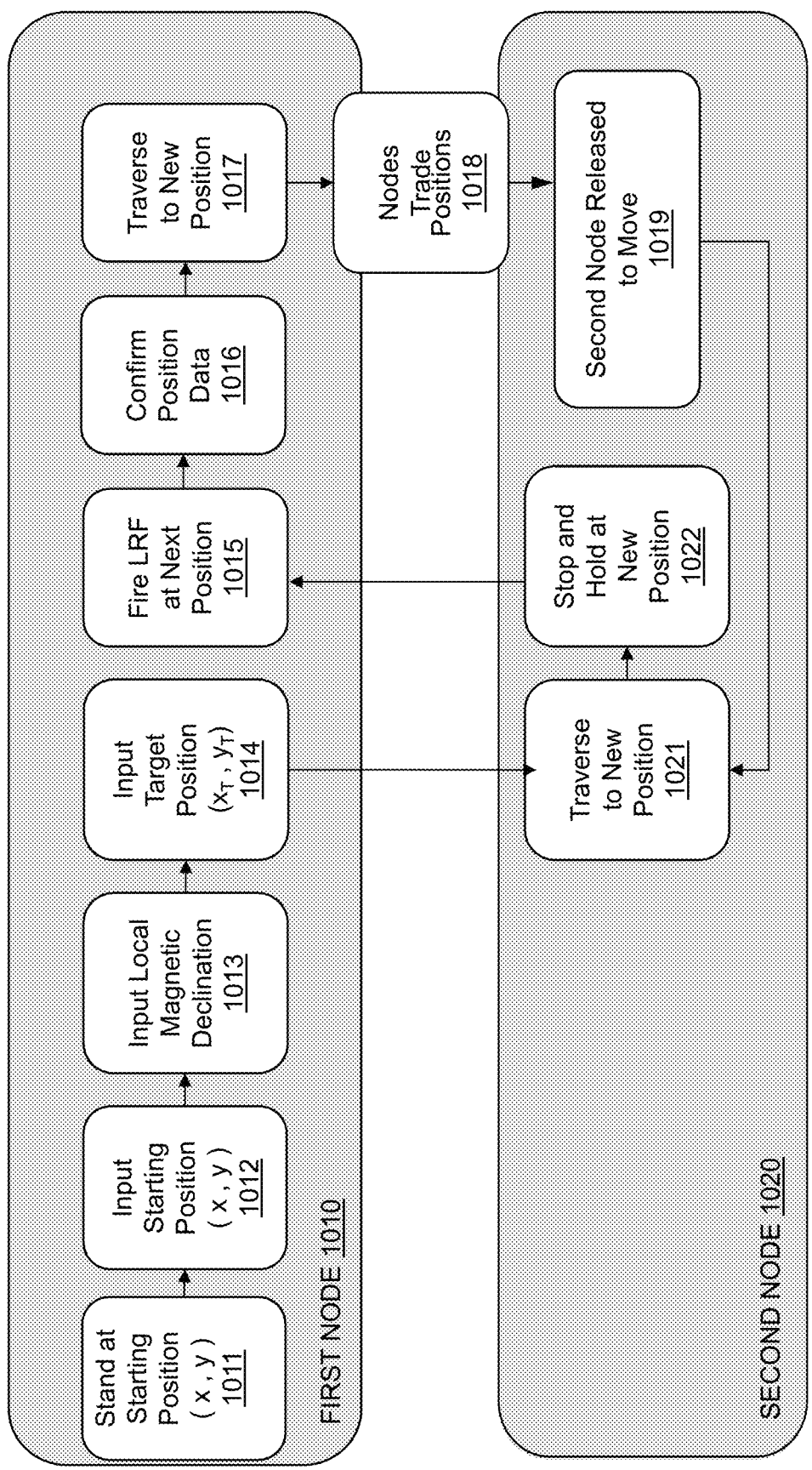
FIG. 10 is an activity diagram for positioning and navigation, in accordance with a representative embodiment.

FIG. 10 is an activity diagram 1000 for positioning and navigation, in accordance with a representative embodiment. This figure may represent actions taken by one or more nodes—e.g., a first node 1010 and a second node 1020 in a positioning and navigation scheme (a leapfrogging scheme) as described herein, e.g., with respect to the method 900 of navigating a route between a starting position and a target position with reference to FIG. 9 above.

The positioning and navigation scheme may begin with the first node 1010 remaining stationary at a starting position as indicated by box 1011. The first node 1010 or another user may enter one or more input values into an application on a computing device, where the application includes code that implements at least a portion of a positioning technique. The input values may include a starting position as indicated by box 1012, a local magnetic declination as indicated by box 1013, a target position as indicated by box 1014, or other information as described herein.

The second node 1020 may traverse to a new position as indicated by box 1021, and the second node 1020 may stop and hold at the new position as indicated by box 1022.

The first node 1010 may acquire relative position data using a laser range finder by firing the laser range finder toward the position of the second node 1020 as indicated by box 1015. When relative position data is obtained, it may be confirmed as indicated by box 1016, e.g., by one or more of the nodes, or automatically by a computing device. The first node 1010 may then traverse to a new position as indicated by box 1017, e.g., the same position as the second 1020 node or another new position. Thus, in this manner, the nodes may trade positions or leapfrog along a route as indicated by box 1018.

The second node 1020 may then be released to move to another position as indicated by box 1019, and the sequence of events may repeat themselves until one or more of the nodes reaches the target position.

One of the advantages of certain implementations described herein is that they are self-contained systems that may not be susceptible to jamming by unintentional or nefarious sources of interference. Other advantages may include an implementation having smaller error growth over time and distance than comparable man-portable systems, such as inertial navigation systems. Implementations may also or instead be time-saving, e.g., by removing much of the manual and mental effort for map reading, removing a need for mechanical compass sightings, and alleviating transformations between map and GPS coordinates (which may be performed automatically by the systems described herein). Additionally, implementations may reduce the cognitive burden of step counting, as well as the burden of performing formal maneuvers such as 'boxing' around terrain obstacles (i.e., four consecutive 90-degree turns, with the first and third leg being equal in length). Implementations may not explicitly require a map to track distance and direction traveled, although one can be used for maintaining position knowledge. Thus, implementations may include a dead-reckoning technique that keeps errors from accumulating markedly with very lengthy times and distances traveled in areas with sparse landmarks and sporadic or missing GPS. In disclosed techniques, occasional absolute position updates may be provided to mitigate or stop error growth from climbing beyond acceptable levels.

In certain implementations, for example, when located in regions with limited GPS signals, other infrastructure-based signals of opportunity may be used such as cell phone towers and the like. By way of example, a node may have a cellular connection in an area but no GPS signal (although likely few regions would fit this criteria), and this cellular connection may be trilaterated and used in the disclosed techniques.

Thus, if GPS is unavailable, other local signals may be utilized in the devices, systems, and methods described herein.

Thus, as described above, systems, and methods may include node-portable relative (dead-reckoning) navigation techniques. Systems may represent a hybridization of concepts from cooperative positioning, orienteering, and field surveying. Systems may generally be low-cost, including a smart phone and a laser range finder, but other implementations and movement schemes may benefit from more sophisticated equipment (e.g., node-to-node radio ranging tools). Systems may serve as a possible alternative to global satellite positioning systems when such systems, for whatever reason, become unavailable or are impractical for users in the field. Teams of hikers, search-and-rescue groups, field surveyors, Special Forces or infantry soldiers, orienteers, and other outdoor explorers may find systems to be beneficial over (or supplemental to) the use of traditional map and compass methods, in order to estimate their position and perform related navigation functions.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of navigating a route between a starting position and a target position, comprising:

measuring relative position data using a laser range finder, the relative position data comprising a distance and a relative angle between a first node having a first computing device located at the starting position and a second node having a second computing device, the relative position data transmitted to a computing device;

receiving by one of the first and second computing devices a second position of the second node based on the relative position data;

traversing to a third position by the first node;

navigating a route between the starting position and the target position by repeating, for a number of different positions, the measuring of relative position data between nodes using the laser range finder, the receiving of positions of nodes by one of the first and second computing devices, and the traversing to a new position for one node based on a received position for another node;

receiving the relative position data by a remote computing device; and providing a computational reconstruction of the route traversed by the first node and the second node on a display of the remote computing device.

2. The method of claim 1, where positions of nodes are shown on a display of one of the first and second computing devices.

3. The method of claim 1, further comprising inputting a value into one of the first and second computing devices.

4. The method of claim 3, where the value includes one or more of the starting position, a local magnetic declination, a known position, and the target position.

5. The method of claim 4, further comprising receiving a correction for one or more positions of one or more nodes based at least in part on the value.

6. The method of claim 1, further comprising receiving a confirmation of the relative position data measured by the laser range finder.

7. The method of claim 1, where the route is a predetermined path between the starting position and the target position.

8. The method of claim 1, further comprising releasing at least one of the first node and the second node to move to a new position.

9. The method of claim 8, further comprising holding at the new position so that relative position data can be measured regarding the new position.

10. A method of navigating a route between a starting position and a target position, comprising:

measuring relative position data using a means for measuring distance and direction, the relative position data comprising a distance and a relative angle between a first node having a first computing device located at the starting position and a second node having a second computing device;

receiving by one of the first and second computing devices a second position of the second node based on the relative position data;

traversing to a third position by the first node;

navigating a route between the starting position and the target position by repeating, for a number of different positions, the measuring of relative position data between nodes using the means for measuring distance and direction, the receiving of positions of nodes by one of the first and second computing devices, and the traversing to a new position for one node based on a received position for another node;

receiving the relative position data by a remote computing device; and providing a computational reconstruction of the route traversed by the first node and the second node on a display of the remote computing device.

11. The method of claim 10, where positions of nodes are shown on a display of one of the first and second computing devices.

12. The method of claim 11, further comprising inputting a value into one of the first and second computing devices.

13. The method of claim 12, where the value includes one or more of the starting position, a local magnetic declination, a known position, and the target position.

14. The method of claim 13, further comprising receiving a correction for one or more positions of one or more nodes based at least in part on the value.

15. The method of claim 11, further comprising receiving a confirmation of the relative position data measured by the laser range finder.

* * * * *